US011089172B2

(12) United States Patent
Yokota et al.

(10) Patent No.: US 11,089,172 B2
(45) Date of Patent: Aug. 10, 2021

(54) IMAGE FORMING APPARATUS

(71) Applicant: CANON KABUSHIKI KAISHA, Tokyo (JP)

(72) Inventors: Akinori Yokota, Tokyo (JP); Yuko Harada, Yokohama (JP); Masaaki Takeuchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 641 days.

(21) Appl. No.: 15/648,667

(22) Filed: Jul. 13, 2017

(65) Prior Publication Data

US 2018/0027136 A1 Jan. 25, 2018

(30) Foreign Application Priority Data

Jul. 20, 2016 (JP) .............................. JP2016-142033

(51) Int. Cl.
*H04N 1/00* (2006.01)
*B41J 29/13* (2006.01)
*B41J 29/02* (2006.01)
*F16B 5/00* (2006.01)
*G03G 21/16* (2006.01)

(52) U.S. Cl.
CPC .......... *H04N 1/00557* (2013.01); *B41J 29/02* (2013.01); *B41J 29/13* (2013.01); *H04N 1/00551* (2013.01); *F16B 5/0012* (2013.01); *G03G 21/1619* (2013.01); *G03G 21/1647* (2013.01); *H04N 2201/0094* (2013.01)

(58) Field of Classification Search
None
See application file for complete search history.

(56) References Cited

U.S. PATENT DOCUMENTS 5,105,210 A * 4/1992 Hirano ....................... B41J 3/37
346/104
5,936,740 A 8/1999 Fukazawa et al.
8,339,688 B2 * 12/2012 Nakahara ............. G03G 15/605
358/474

(Continued)

FOREIGN PATENT DOCUMENTS

CN 1151580 A 6/1997
CN 1940742 A 4/2007

(Continued)

OTHER PUBLICATIONS

Chinese Office Action. dated Mar. 31, 2020, in Chinese Application No. 201710593181.7.

*Primary Examiner* — Jill E Culler
(74) *Attorney, Agent, or Firm* — Venable LLP

(57) ABSTRACT

An image forming apparatus for forming an image on a recording material includes a first outer cover, a second outer cover adjacent to the first outer cover, a third outer cover adjacent to both of the first outer cover and the second outer cover, a common positioning portion provided on the first outer cover and configured to position both of the second outer cover and the third outer cover relative to the first outer cover, a first positioned portion provided on the second outer cover and configured to be positioned relative to the common positioning portion, and a second positioned portion provided on the third outer cover and configured to be positioned together with the first positioned portion relative to the common positioning portion.

14 Claims, 7 Drawing Sheets

(56) References Cited

U.S. PATENT DOCUMENTS

| | | | |
|---|---|---|---|
| 8,649,703 B2 | 2/2014 | Yamazaki | |
| 2007/0002290 A1* | 1/2007 | Muraki | B41J 3/46 353/119 |
| 2007/0071492 A1* | 3/2007 | Ito | H04N 1/00519 399/107 |
| 2008/0007935 A1 | 1/2008 | Kondo et al. | |
| 2009/0051726 A1* | 2/2009 | Silverbrook | B41J 2/16505 347/29 |
| 2009/0274484 A1 | 11/2009 | Takemoto | |
| 2011/0280615 A1 | 11/2011 | Imai | |
| 2013/0108317 A1* | 5/2013 | Tsuchiya | H04N 1/00397 399/110 |
| 2014/0029050 A1* | 1/2014 | Chen | G06K 15/40 358/1.15 |
| 2015/0022958 A1* | 1/2015 | Tsubakimoto | F16B 5/0664 361/679.01 |
| 2015/0097909 A1 | 4/2015 | Ueda et al. | |
| 2015/0304513 A1* | 10/2015 | Tu | H04N 1/00557 358/1.13 |

FOREIGN PATENT DOCUMENTS

| | | |
|---|---|---|
| CN | 101105664 A | 1/2008 |
| CN | 101571686 A | 11/2009 |
| CN | 104160319 A | 11/2014 |
| JP | 2002-33869 A | 1/2002 |
| JP | 2003-078256 A | 3/2003 |
| JP | 2011-242511 A | 12/2011 |
| JP | 2012-054871 A | 3/2012 |
| JP | 2012-098405 A | 5/2012 |
| JP | 2015-018052 A | 1/2015 |

\* cited by examiner

C-C

IMAGE FORMING APPARATUS

FIELD OF THE INVENTION AND RELATED ART

The present invention relates to an image forming apparatus of which a side surface is covered with a plurality of outer covers.

An outer cover for covering the side surface of the image forming apparatus is constituted by a plurality of parts by because of the assembling process and the mold used during molding of the outer covers. A gap or a stepped portion occurs between the outer covers. In order to maintain a fine outer appearance, the gap or the stepped portion should be constituted so as to be uniform and small (for example, Japanese Laid-Open Patent Application 2012-54871).

However, there can be a case where one gap between outer covers and another gap between outer covers are different from each other, so that the outer appearance is degraded. This will be described with reference to FIGS. 6, 7A and 7B.

In an image forming apparatus 60 shown in FIG. 6, at an upper portion of a first outer cover 61 covering a side surface of the image forming apparatus 60, a second outer cover 62 and a third outer cover 63 are provided adjacent to each other, and on the third outer cover 63, an image reading device 64 is mounted.

In an image forming apparatus 60, each of the second outer cover 62 and the third outer cover 63 is independently positioned at a position relative to the first outer cover 61. As shown in FIGS. 7A and 7B, the first outer cover 61 is provided with projections 61a and 61b. On the other hand, the second outer cover 62 is provided with positioning portions 62a each including a hole engageable with the projection 61a, and the third outer cover 63 is provided with positioning portions 63a each including a hole engageable with the projection 61b.

Further, the projections 61a of the first outer cover 61 are engaged with the holes of the second outer cover 62, so that a position of the second outer cover 62 relative to the first outer cover 61 is determined. As a result, a gap 68 between the first outer cover 61 and the second outer cover 62 at the side surface of the apparatus is defined. Further, the projections 61b of the first outer cover 61 are engaged with the holes of the third outer cover 63, so that a position of the third outer cover 63 relative to the first outer cover 61 is determined. As a result, a gap 67 between the first outer cover 61 and the third outer cover 63 at the side surface of the apparatus is defined.

When the image reading device 64 is mounted on the image forming apparatus 60, the positioning portions 63a are deformed by a weight of the image reading device 64, so that the gap 67 between the first outer cover 61 and the third outer cover 63 becomes small. As a result, a difference generates between the gap 68 and the gap 67, so that an outer appearance of the outer covers is defiled (worsens).

Further, as shown in FIG. 6, at an upper portion of the second outer cover 62, an operating panel 65 is provided. In this case, when a user operates the operating panel 65, the positioning portions 62a are deformed by applying a force in a direction of an arrow 69 by the user, so that the gap 68 between the first outer cover 61 and the second outer cover 62 becomes small. Also in this operation, a difference generates between the gap 68 and the gap 67, so that the outer appearance is defiled.

SUMMARY OF THE INVENTION

A principal object of the present invention is to provide an image forming apparatus and a multi-function printer which are capable of maintaining an excellent outer cover by reducing a difference in gap among a plurality of outer covers even when a force is applied to the outer covers.

According to an aspect of the present invention, there is provided an image forming apparatus for forming an image on a recording material. The image forming apparatus includes a first outer cover, a second outer cover adjacent to the first outer cover, and a third outer cover adjacent to both of the first outer cover and the second outer cover. A common positioning portion is provided on the first outer cover and configured to position both of the second outer cover and the third outer cover relative to the first outer cover. A first positioned portion is provided on the second outer cover and configured to be positioned relative to the common positioning portion; and a second positioned portion is provided on the third outer cover and configured to be positioned together with the first positioned portion relative to the common positioning portion.

According to another aspect of the present invention, there is provided a multi-function printer. The printer includes an image forming unit configured to form an image on a recording material and an image reading unit mounted on the image forming unit. The image reading unit is configured to read the image on an original. The image forming unit includes a first outer cover, a second outer cover adjacent to the first outer cover, and a third outer cover adjacent to both of the first outer cover and the second outer cover. A common positioning portion is provided on the first outer cover and configured to position both of the second outer cover and the third outer cover relative to the first outer cover. A first positioned portion is provided on the second outer cover and configured to be positioned relative to the common positioning portion, and a second positioned portion is provided on the third outer cover and configured to be positioned together with the first positioned portion relative to the common positioning portion.

Further features of the present invention will become apparent from the following description of exemplary embodiments with reference to the attached drawings.

DESCRIPTION OF EMBODIMENTS

Embodiments of the present invention will be specifically described with reference to the drawings. Dimensions, materials, shapes and relative arrangements of constituent elements described in the following embodiments should be appropriately be changed depending on structures and various conditions of devices (apparatuses) to which the present invention is applied. Accordingly, the scope of the present invention is not intended to be limited to the following embodiments unless otherwise specified.

Embodiment 1

(Image Forming Apparatus)

Figure 1:
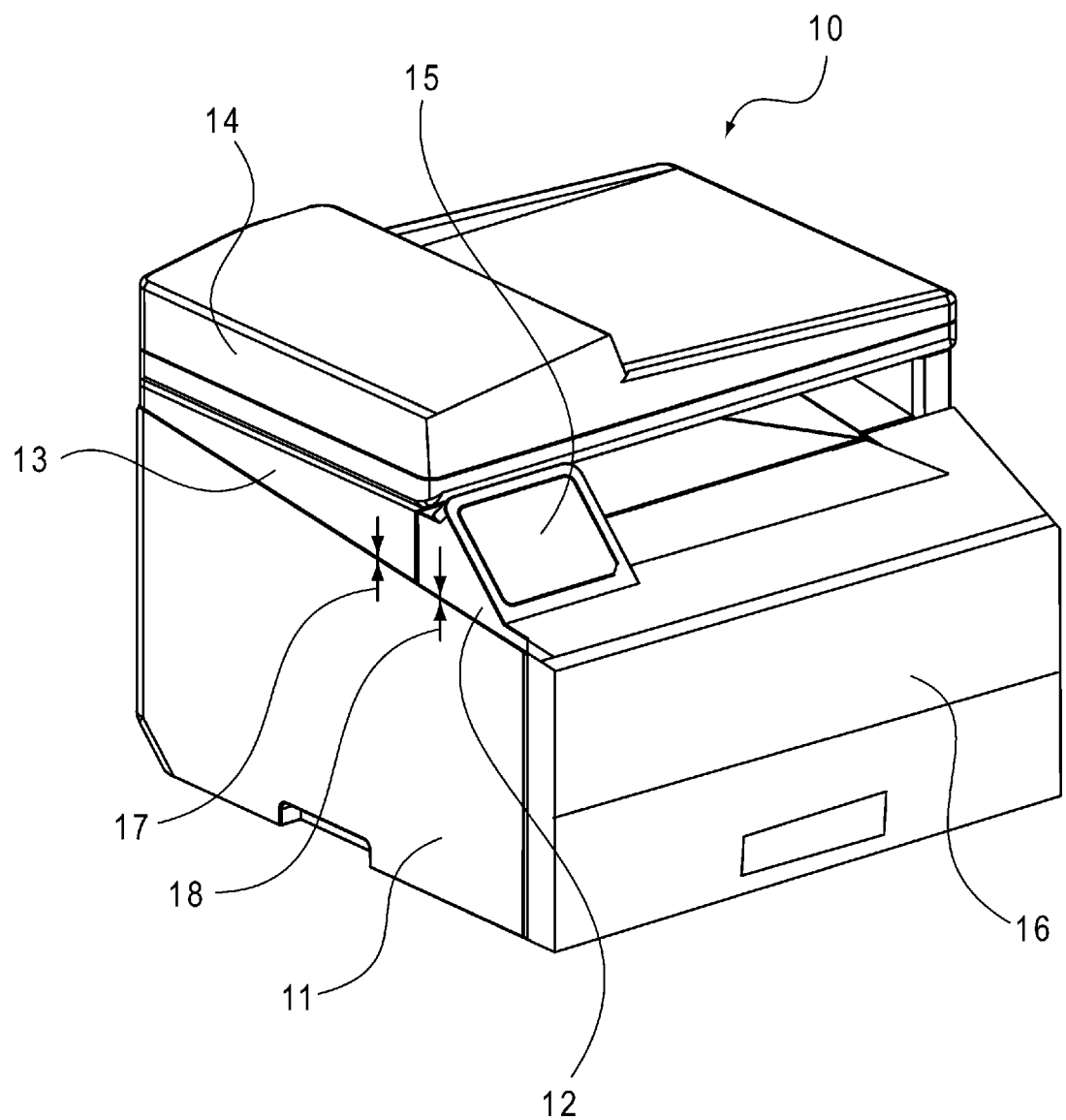
FIG. 1 is a perspective view of an outer appearance of an image forming apparatus in Embodiment 1.

With reference to FIG. 1, a general structure of an image forming apparatus according to Embodiment 1 of the present invention will be described. As shown in FIG. 1, an image forming apparatus 10 holds feeding portions, an image forming portion, a fixing portion, and a discharging portion by an unshown frame. The frame is covered with a plurality of outer covers 11, 12, 13 and 16. The outer covers covering a part of side surfaces of the image forming apparatus 10 are constituted as a plurality of outer covers as described above for reasons of an assembling property and a metal mold.

Of the plurality of outer covers covering the image forming apparatus (image forming unit) 10, a first outer cover 11 covers a part of a side surface of the image forming apparatus. At an upper portion of the first outer cover 11, a second outer cover 12 and a third outer cover 13 are disposed adjacent to each other. In the image forming apparatus 10 shown in FIG. 1, on the third outer cover 13, an image reading device (image reading unit) 14 for reading an image on an original is provided, and the second outer cover 2 is provided with an operating panel 15. Here, a gap between the first outer cover 11 and the outer cover 12 is a first gap 18, and a gap between the first outer cover 11 and the third outer cover 13 is a second gap 17. The apparatus shown in FIG. 1 is a multi-function printer including the image forming unit 10 and the image reading unit 14.

(Positioning Constitution of Outer Covers)

Figure 2A:
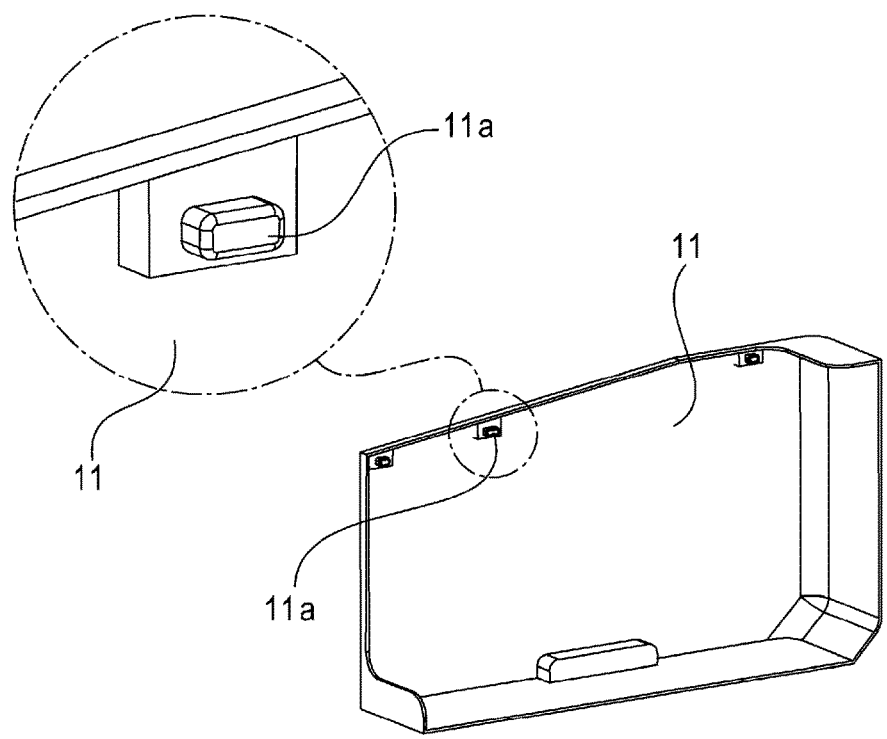
FIG. 2A is a perspective view of a first outer cover in Embodiment 1.
Figure 2B:
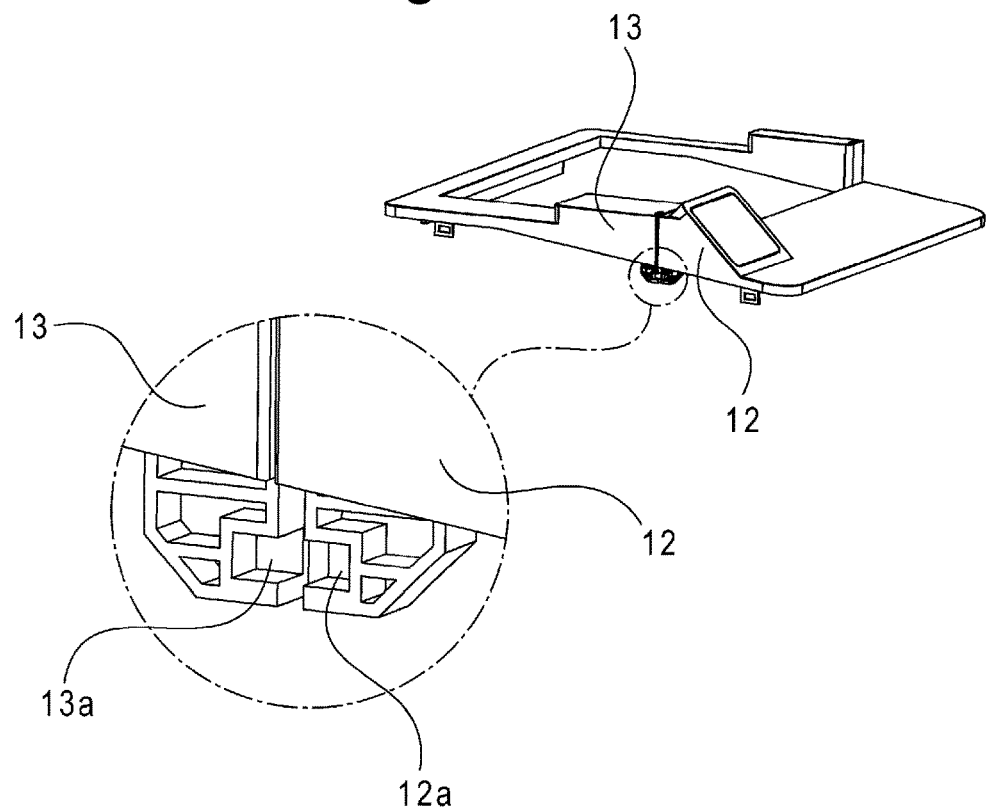
FIG. 2B is a perspective view of second and third outer covers in Embodiment 1.

A positioning construction of the respective outer covers 11, 12 and 13 will be described with reference to FIGS. 2A and 2B. FIG. 2A is a perspective view of the first outer cover 11 in an inner surface side. FIG. 2B is a perspective view of the second outer cover 12 and the third outer cover 13. As shown in FIG. 2B, the second outer cover 12 has a size extending from a side surface to an upper surface of the apparatus. The third outer cover 13 has a size extending from the side surface to the upper surface of the apparatus.

As shown in FIG. 2A, the first outer cover 11 is provided with a positioning portion (a single common positioning portion) 11a for positioning both of the second outer cover 12 and the third outer cover relative to the first outer cover 11. Between the positioning portion 11a and an outer cover surface, a lightening portion is provided and devised so as to prevent a sink mark or the like being generated during molding.

As shown in FIG. 2B, the second outer cover 12 is provided with a positioning portion (first positioning portion) 12a to be positioned relative to positioning portion 11a described above. The positioning portion 12a is provided at a position corresponding to the positioning portion 11a of the first outer cover 11. The positioning portion 12a has a cap shape which opens on one side.

Further, as shown in FIG. 2B, the third outer cover 13 is provided with a positioning portion (second positioning portion) 13a to be positioned together with the positioning portion 12a of the second outer cover 12 relative to the above described positioning portion 11a. The positioning portion 13a is provided at a position corresponding to the positioning portion 11a of the first outer cover 11. The positioning portion 13a has a cap shape which opens on one side. An open portion of the positioning portion 13a opposes an open portion of the positioning portion 12a.

The positioning portion 11a of the first outer cover 11 engages with each of the positioning portion 12a of the second outer cover 12 and the positioning portion 13a of the third outer cover 13, and thus defines a gap 18 between the first outer cover 11 and the second outer cover 12 and a gap 17 between the first outer cover 11 and the third outer cover 13, respectively. Hereinafter, the first positioning portion 11a of the first outer cover is referred to as the common positioning portion 11a. The gap 18 is the gap at an apparatus side surface between the first outer cover 11 and the second outer cover 12. The gap 17 is the gap at the apparatus side surface between the first outer cover 11 and the third outer cover 13.

Figure 3:
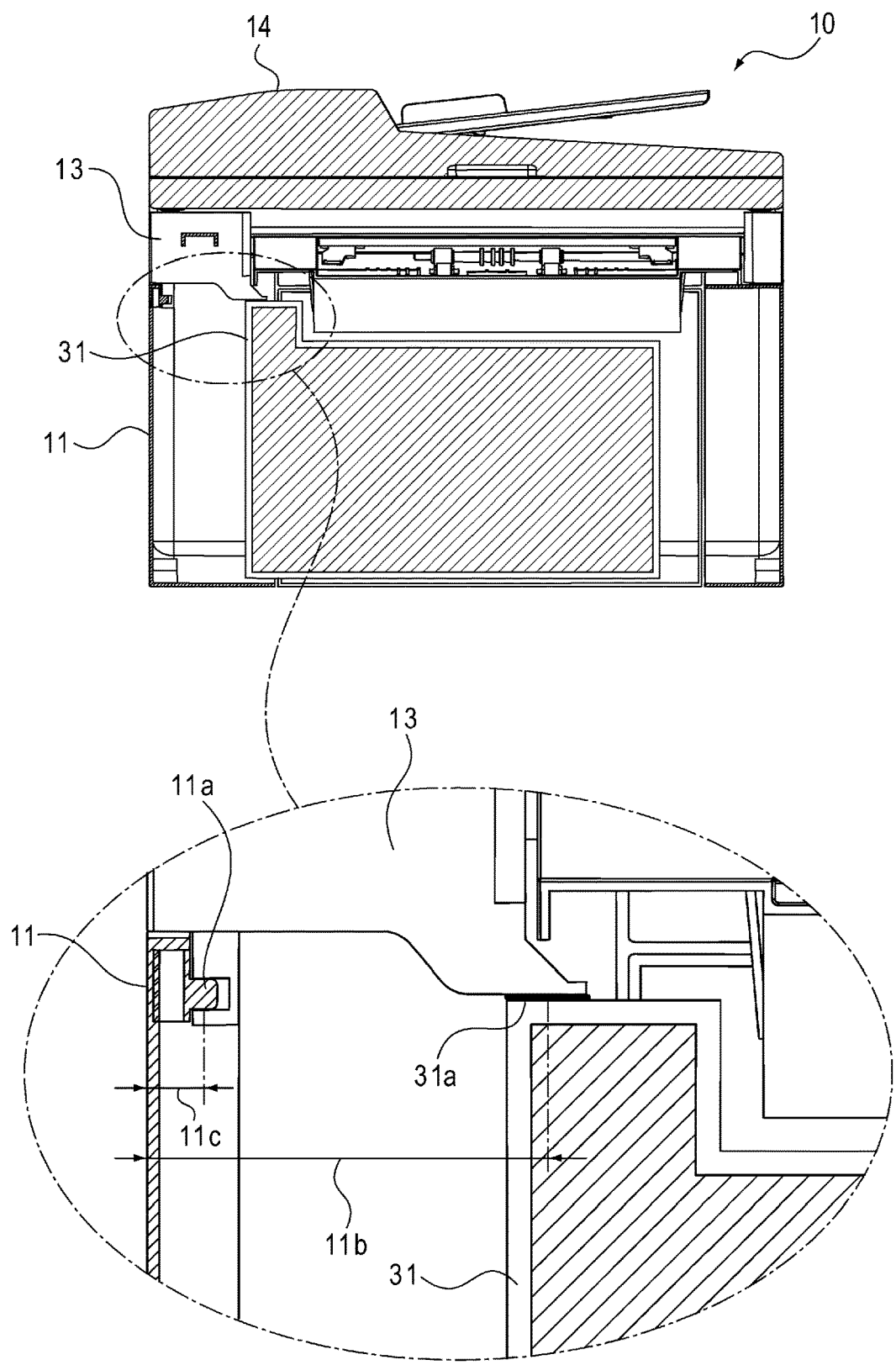
FIG. 3 is a schematic view showing a positioning constitution of the outer covers of the image forming apparatus in Embodiment 1.

FIG. 3 is a schematic view showing a relationship between positioning of the third outer cover 13 relative to a main assembly frame 31 and positioning of the first outer cover 11 relative to the main assembly frame 31 with respect to a widthwise direction of the apparatus main assembly.

The third outer cover 13 is connected with the main assembly frame 31 at a flat surface portion 31a on the main assembly frame 31 by unshown screws. The flat surface portion 31a on the main assembly frame 31 is a mounting position where the third outer cover 13 is mounted to the apparatus main assembly of the image forming apparatus. In this embodiment, although the second outer cover 12 is not illustrated, also the second outer cover 12 is connected with the main assembly frame 31 at the flat surface portion 31a on the main assembly frame 31 by unshown screws. In this embodiment, a constitution in which a distance $11c$ from a side surface portion (outer cover surface) of the first outer cover 11 to the common positioning portion 11a is shorter (smaller) than a distance $11b$ from the side surface portion (outer cover surface) of the first outer cover 11 to the flat surface portion 31a is employed.

(Effects)

According to the above-described constitution, the first gap 18 and the second gap 17 are defined by the single common positioning portion 11a constituted as a part of the first outer cover 11. For that reason, even when the third outer cover 13 is deformed by the weight of the image reading device 14, also the common positioning portion 11a is similarly deformed, so that the case where a difference generates between the first gap 18 and the second gap 17 decreases and thus it is possible to maintain an excellent outer appearance.

Further, the positioning portion 12a of the second outer cover 12 and the positioning portion 13a of the third outer cover 13 are constituted in the cap shapes having the open portions provided in one side so as to oppose each other. For that reason, even in the case where a force is externally exerted on the positioning portions 12a and 13a, the positioning portions 12a and 13a are capable of maintaining the first gap 18 and the second gap 17 in a certain state, so that the excellent outer appearance can be maintained. Further, the constitution in which the distance $11c$ from the side surface portion of the first outer cover 11 to the common positioning portion 11a is shorter than the distance $11b$ from the side surface portion of the first outer cover 11 to the mounting position (flat surface portion 31) of the third outer cover 13 to the main assembly frame 31 is employed. As a result, in the case where a large force is exerted from above the apparatus on the third outer cover 13, a shape of the third outer cover 13 at a portion from a main assembly frame mounting portion to the apparatus side surface is liable to be deformed, but the positioning portions of the first outer cover 11 and the third outer cover 13 are close to the side surface portion and are firm, and therefore, a possibility of a change in second gap 17 is small. Also as regards the second outer cover 12 constituted similarly as in the case of the third outer cover 13, the positioning portions of the first outer cover 11 and the second outer cover 12 are close to the side surface portion and are firm, and therefore, a possibility of a change in first gap 18 is small. Further, as described above, the first gap 18 and the second gap 17 are defined by the common positioning portion, and therefore, the case where the difference generates between the first gap 18 and the second gap 17 becomes small, so that the excellent outer appearance can be maintained.

Further, similar to the deformation of the third outer cover 13 by the weight of the image reading device 14, by operating the operating panel 15 provided on the second outer cover 12 by the user, there is a possibility that the second outer cover 12 is deformed. Also in this case, the first gap 18 and the second gap 17 are defined by the common positioning portion 11a, and therefore, there is a small possibility that the difference generates between the first gap 18 and the second gap 17, so that the excellent outer appearance can be maintained.

Embodiment 2

An image forming apparatus according to Embodiment 2 will be described. In this embodiment, a general structure of the image forming apparatus and a positioning constitution of the second outer cover and the third outer cover relative to the first outer cover are similar to those in the above-described Embodiment 1, and therefore, members having the same functions are represented by the same reference numerals or symbols and will be omitted from description.
(General Structure of Image Forming Apparatus 9

Figure 4:
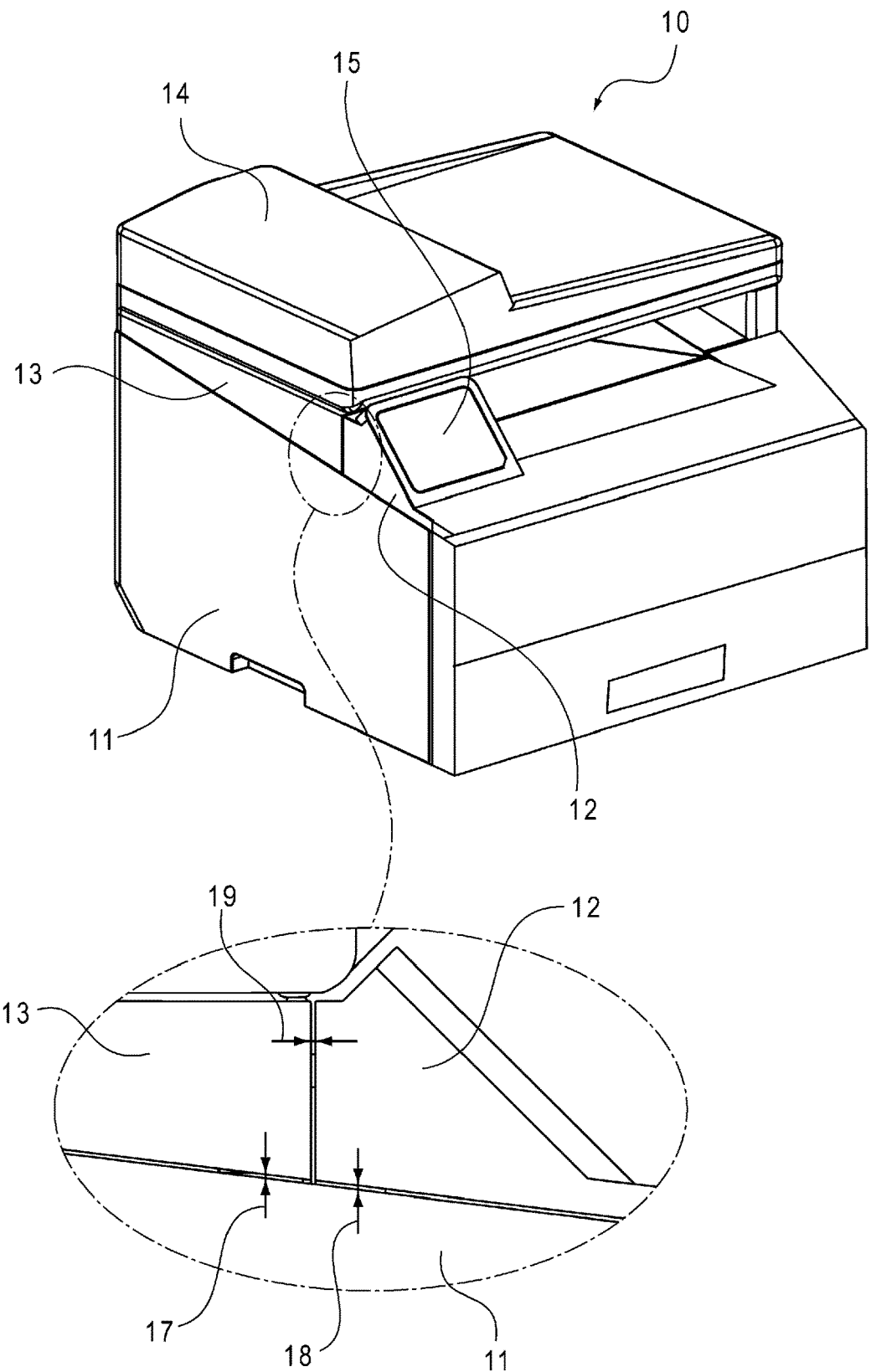
FIG. 4 is a perspective view of an outer appearance of an image forming apparatus in Embodiment 2.

As shown in FIG. 4, also in this embodiment, outer covers are constituted separately into a plurality of parts similarly as in Embodiment 1. In this embodiment, similarly as in Embodiment 1, the first outer cover 11 covering the apparatus side surface, and the second outer cover 12 and the third outer cover 13 which are disposed at the upper portion of the first outer cover 11 so as to be adjacent to each other are illustrated. Further, in this embodiment, a gap between the second outer cover 12 and the third outer cover 13 is a gap 19. The gaps 18 and 17 are the first and second gaps, respectively, similarly as in the above-described Embodiment 1. That is, the gap 18 is the first gap between the first outer cover 11 and the second outer cover 12. The gap 17 is the second gap between the first outer cover 11 and the third outer cover 13.
(Positioning Constitution of Outer Covers)

Figure 5A:
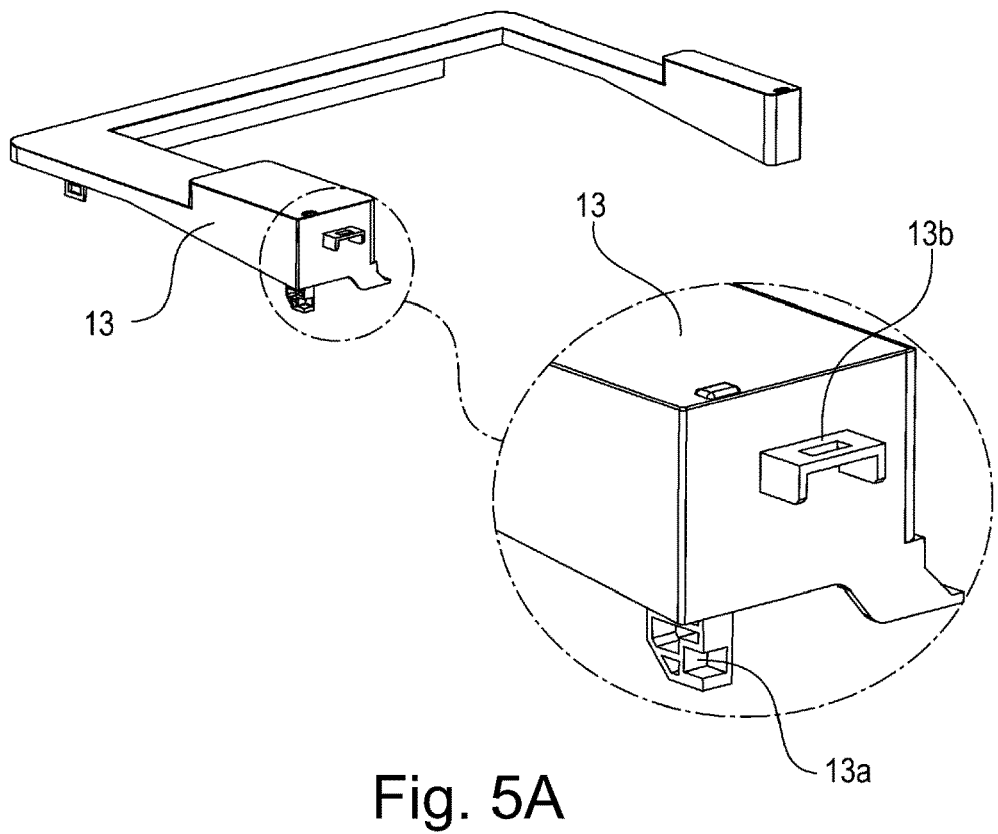
FIG. 5A is a perspective view showing a positioning construction of the third outer cover in Embodiment 2.
Figure 5B:
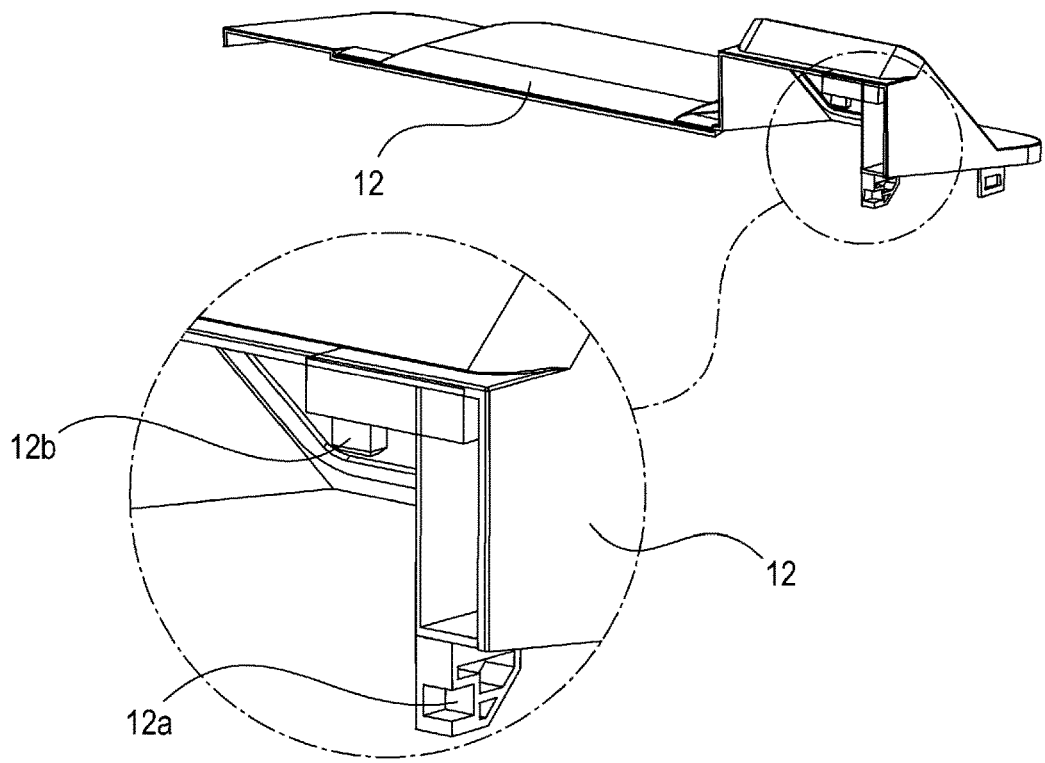
FIG. 5B is a perspective view showing a positioning construction of the second outer cover in Embodiment 2.
Figure 6:
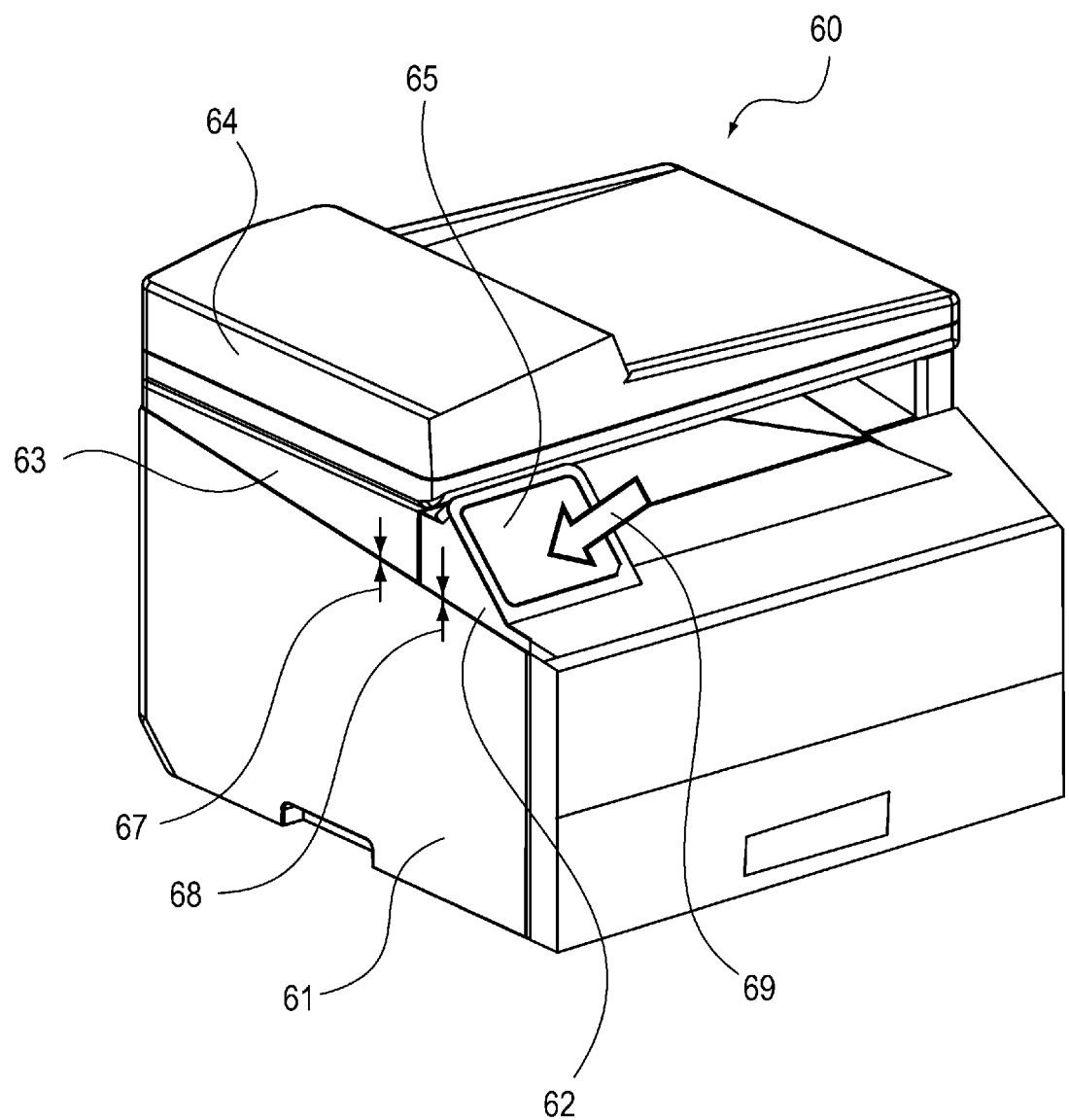
FIG. 6 is a perspective view of an outer appearance of an image forming apparatus in a comparison example.
Figure 7A:
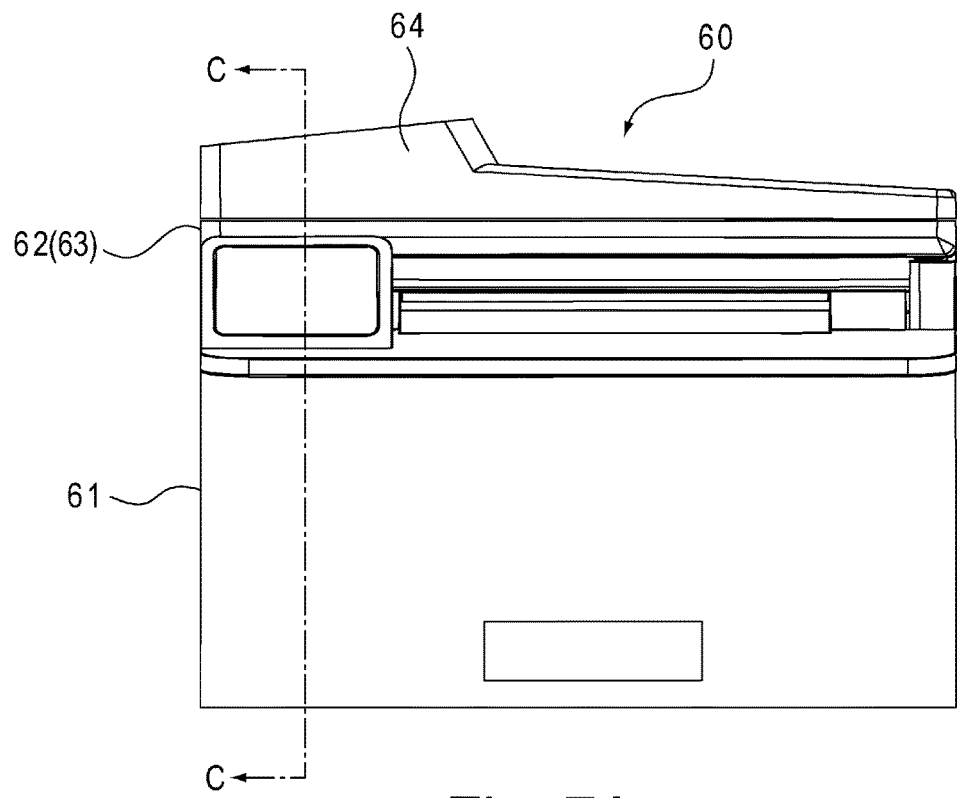
FIGS. 7A and 7B are schematic views showing a positioning construction of outer covers in the comparison example.
Figure 7B:
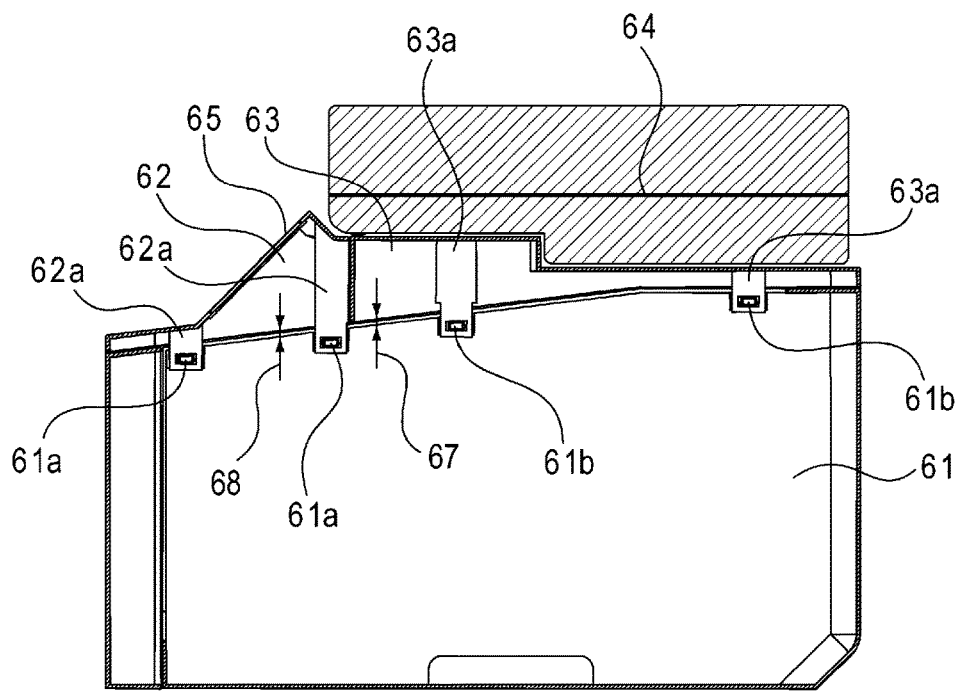

A characteristic structure of an image forming apparatus according to this embodiment will be described with reference to FIGS. 5A and 5B. FIG. 5A is a perspective view of the third outer cover 13, and FIG. 5B is a perspective view of the second outer cover 12.

In this embodiment, in addition to the positioning constitution of the above-described Embodiment 1, positioning portions 12b and 13b for defining the gap 19 between the second outer cover 12 and the third outer cover 13 are provided between the second outer cover 12 and the third outer cover 13. The second outer cover 12 and the third outer cover 13 are connected with each other by engagement between the positioning portion 12b provided to the second outer cover 12 and the positioning portion 13b provided at a position, of the third outer cover 13, corresponding to the positioning portion 12b. As a result, the second outer cover 12 and the third outer cover 13 which are disposed adjacent to each other are positioned relative to each other, so that the third gap 19 therebetween is defined.
(Effect)

According to this embodiment, not only the first gap 18 and the second gap 17 in Embodiment 1 can be uniformly maintained, but also the third gap 19 can be positioned with accuracy, so that an excellent outer appearance can be obtained.

Incidentally, in the above-described Embodiments 1 and 2, each of the first gap 18, the second gap 17 and the third gap 19 may have a certain size or may also be zero.

According to the present invention, even when the third outer cover is deformed by the weight of the image reading device, also the common positioning portion is similarly deformed, and therefore, the excellent outer appearance can be maintained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-142033 filed on Jul. 20, 2016, which is hereby incorporated by reference herein in its entirety.

What is claimed is:

1. An image forming apparatus for forming an image on a recording material, the image forming apparatus comprising:
   a first outer cover;
   a second outer cover adjacent to said first outer cover in a first direction;
   a third outer cover adjacent to said first outer cover in the first direction and adjacent to said second outer cover in a second direction crossing the first direction;
   a first recess provided on said second outer cover;
   a second recess provided on said third outer cover; and
   a projection provided on said first outer cover and configured to engage with said first recess and said second recess so as to restrict the movement of said second outer cover and said third outer cover relative to said first outer cover in the first direction.

2. An image forming apparatus according to claim 1, wherein the first direction is a vertical direction, and
   wherein said first, second and third outer covers are covers configured to cover the same side surface of said image forming apparatus.

3. An image forming apparatus according to claim 2, wherein said second outer cover has a size extending from the side surface of said image forming apparatus to an upper surface of said image forming apparatus, and
   wherein at an upper surface portion of said second outer cover, an operating panel is provided.

4. An image forming apparatus according to claim 2, wherein said third outer cover has a size extending from the side surface of said image forming apparatus to an upper surface of said image forming apparatus, and
   wherein at the upper surface of said image forming apparatus including said third outer cover, an image reading unit configured to read an image on an original is mountable.

5. An image forming apparatus according to claim 1, wherein between said second and third outer covers, a positioning portion configured to position said second and third outer covers relative to each other is provided.

6. An image forming apparatus according to claim 1, further comprising a frame,
wherein said second and third outer covers are connected with said frame, and
wherein a distance from an outer cover surface of said first outer cover to said projection is smaller than a distance from an outer cover surface of said second and third outer covers to a connecting portion of said frame.

7. An image forming apparatus according to claim 1, wherein said first recess and said second recess are provided at positions opposing each other in the second direction, and
wherein said first recess and said second recess have a shape which does not restrict separation from each other in the second direction.

8. A multi-function printer comprising:
an image forming unit configured to form an image on a recording material;
an image reading unit mounted on said image forming unit and configured to read the image on an original, said image forming unit including:
(i) a first outer cover;
(ii) a second outer cover adjacent to said first outer cover in a first direction;
(iii) a third outer cover adjacent to said first outer cover in the first direction and adjacent to said second outer cover in a second direction crossing the first direction;
(iv) a first recess provided on said second outer cover;
(v) a second recess provided on said third outer cover; and
(vi) a projection provided on said first outer cover and configured to engage with said first recess and said second recess so as to restrict the movement of said second outer cover and said third outer cover relative to said first outer cover in the first direction.

9. A multi-function printer according to claim 8, wherein the first direction is a vertical direction, and wherein said first, second and third outer covers are covers configured to cover the same side surface of said image forming apparatus.

10. A multi-function printer according to claim 9, wherein said second outer cover has a size extending from the side surface of said image forming unit to an upper surface of said image forming unit, and
wherein at an upper surface portion of said second outer cover, an operating panel is provided.

11. A multi-function printer according to claim 9, wherein said third outer cover has a size extending from the side surface of said image forming unit to an upper surface of said image forming unit, and
wherein said image reading unit is mounted on the upper surface of said image forming unit including said third outer cover.

12. A multi-function printer according to claim 8, wherein between said second and third outer covers, a positioning portion configured to position said second and third outer covers relative to each other is provided.

13. A multi-function printer according to claim 8, wherein said image forming unit further includes a frame,
wherein said second and third outer covers are connected with said frame, and
wherein a distance from an outer cover surface of said first outer cover to said projection is smaller than a distance from an outer cover surface of said second and third outer covers to a connecting portion of said frame.

14. A multi-function printer according to claim 8, wherein said first recess and said second recess are provided at positions opposing each other in the second direction, and
wherein said first recess and said second recess have a shape which does not restrict separation from each other in the second direction.

* * * * *